UNITED STATES PATENT OFFICE.

WILLIAM W. UNDERHILL, OF BROOKLYN, NEW YORK.

ART OF MANUFACTURING STARCH.

SPECIFICATION forming part of Letters Patent No. 294,530, dated March 4, 1884.

Application filed January 2, 1884. (No specimens.)

*To all whom it may concern:*

Be it known that I, WILLIAM W. UNDERHILL, of the city of Brooklyn, in the county of Kings and State of New York, a citizen of the United States, have invented a new and useful Improvement in the Art of Manufacturing Starch, of which the following is a specification.

The object of this improvement is to effect greater economy in the cost of the production of starch and to obtain a product of superior quality.

In carrying out my invention I first soak the corn or other grain in water at a temperature of from 100° to 150° Fahrenheit, depending upon the kind and quality of the grain and the time deemed requisite to reach that condition of softness most suitable for grinding with the best results. This is left to the judgment of the operator skilled in the art of starch-making. I then grind the grain, after the above-mentioned soaking, in any suitable mill or mills, with the requisite supply of water, as has been customary in the manufacture of starch. From the mills I run the ground pulpy mass onto vibrating sieves or separators, or into revolving reel-sieves—both well-known apparatuses in starch-making—for the purpose of separating the bran, husks, &c., from the starchy fluid, variously termed "starch-liquor" and "starch-water," which, after passing through the sieves, is collected into a vat or vats, and which contains nearly all the starch of the grain and some gluten and other matters.

The process, as so far described, has long been practiced in the starch manufacture; but at this point there has been under the old methods great liability to fermentation in the vats referred to, whereby the yield of the starch is reduced and its quality impaired. In order to prevent this fermentation and to secure the greatest yield and best quality of starch, my invention consists in the introduction into the starch-water or starch-liquor at this stage of the process of a sufficient quantity of sulphurous acid to act as an antiseptic. The starch-liquor or starch-water, to be in the best condition to receive the sulphurous acid, should have a density of from 3° to 6° Baumé, to which density it may, if necessary, be brought either by dilution or concentration in the ordinary vats above mentioned, or in other suitable vessels into which it may be delivered from the said vats. The quantity of acid introduced into the liquor should be sufficient to produce a decided acid reaction. It may be introduced into the liquor gradually or a little at a time till the acid reaction is indicated by any of the well-known tests for acid, the liquid being in the meantime stirred continually, that the acid may thoroughly permeate the whole of the liquor. I propose, generally, to continue this stirring for from one to two hours or more. The stirring may be effected by any known means; but I prefer to effect it by means of stirrers attached to a rotary shaft placed within the vessel and driven by suitable gearing. After this treatment with acid, I run the starch-liquor over the usual starch planes or tables, for the purpose of subsidence; or I may submit it to the older well-known process of subsidence and decantation in cisterns; and both the starch subsiding and the tailings, or that which does not subside, but passes off at the lower end of the runs, or that which is supernatant in the cisterns, may be treated by any of the methods known to starch-manufacturers for the completion of the process of manufacture.

I am aware that in the manufacture of starch sulphurous acid has been introduced into the water used for soaking the grain preparatory to grinding, and that it has also been used by introducing it into the ground mass after the latter has left the mills and prior to sieving; but both of these methods are less economical than mine, as they require larger quantities of the sulphurous acid, owing in part to its becoming exhausted by great dilution before it reaches that stage in the process which is the point of its greatest usefulness—viz., after the starch-liquor has been separated from the bran and coarser parts of the grain—and in part to its being largely wasted by being expended upon the said bran and coarser parts or refuse.

In view of the above-mentioned heretofore-practiced methods, I do not claim the use of sulphurous acid in the manufacture of starch at any other stage than that at which I have hereinabove described its use as my invention; but

What I claim as new and my invention, and desire to secure by Letters Patent, is—

1. The improvement in the art of manufacturing starch, consisting in the introduction into the starch-liquor or starch-water, after its separation by sieving from the bran and coarser parts of the grain, of a sufficient quantity of sulphurous acid to produce an acid reaction, substantially as and for the purpose herein described.

2. The improved method of manufacturing starch, consisting in first bringing the starch-water or starch-liquor which has been sieved from the bran and coarser portions of the soaked and ground grain to a density of 3° to 6°, then adding sufficient sulphurous acid to obtain an acid reaction, and afterward obtaining the subsidence of the starch from the said starch-water or starch-liquor, substantially as herein described.

W. W. UNDERHILL.

Witnesses:
FREDK. HAYNES,
HENRY T. BROWN.